UNITED STATES PATENT OFFICE.

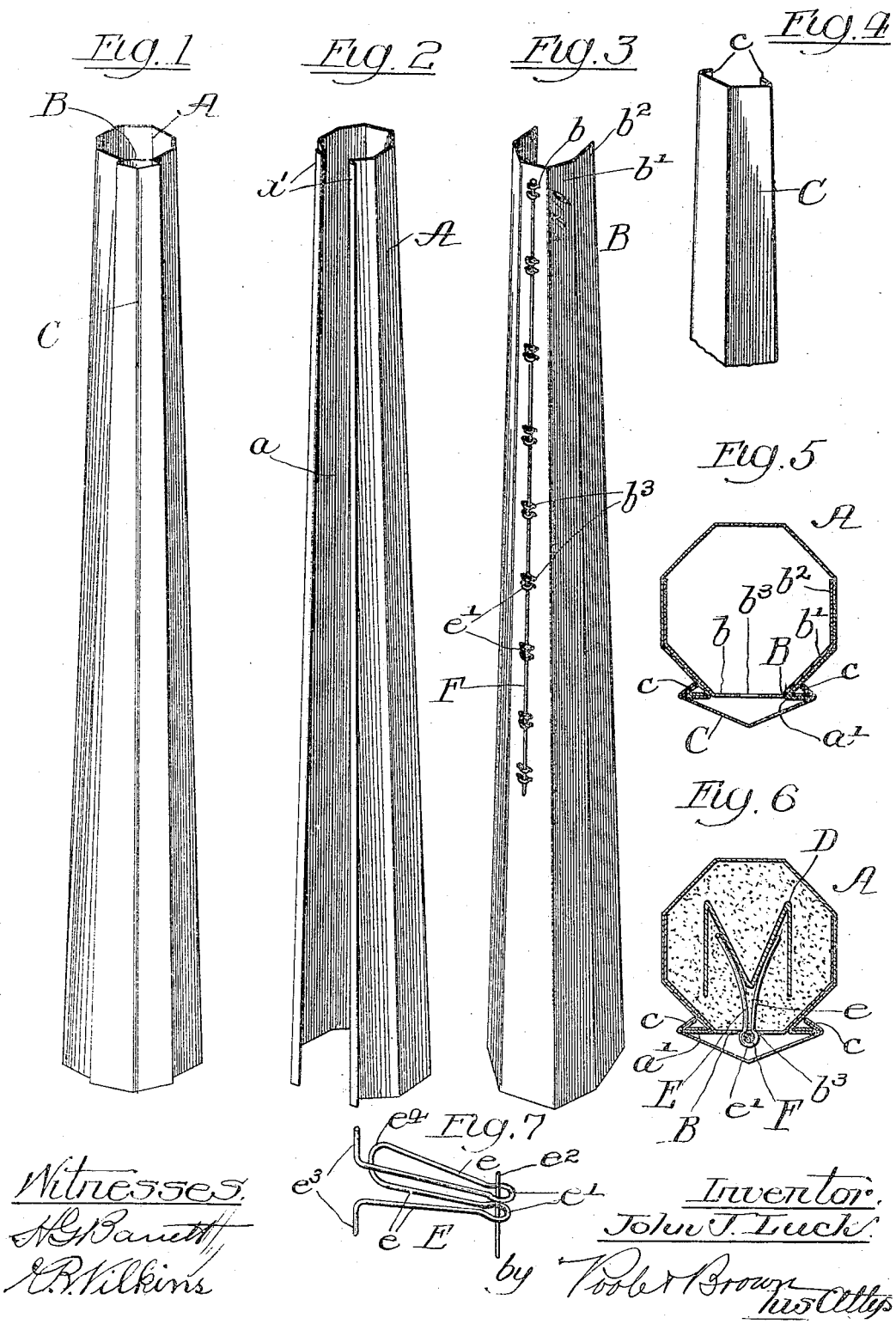

JOHN J. LUCK, OF AURORA, ILLINOIS.

MOLD FOR CEMENT FENCE-POSTS AND THE LIKE.

No. 808,394.     Specification of Letters Patent.     Patented Dec. 26, 1905.

Application filed May 11, 1905. Serial No. 259,880.

*To all whom it may concern:*

Be it known that I, JOHN J. LUCK, a citizen of the United States, residing at Aurora, in the county of Kane and State of Illinois, have invented certain new and useful Improvements in Molds for Cement Fence-Posts and the Like; and I do hereby declare that the following is a full, clear, and exact description thereof, reference being had to the accompanying drawings, and to the letters of reference marked thereon, which form a part of this specification.

This invention relates to improvements in molding devices for molding or forming fence-posts and like elongated articles which are molded or given form while in a plastic state and which subsequently harden to retain the form given thereto.

The mold herein shown is generally like that illustrated in my prior application for United States Letters Patent, filed April 14, 1905, Serial No. 255,638, wherein the mold consists of a receiving-shell into which the plastic material is poured and in which it hardens and is constructed to be expanded so as to be readily removed from the set form, and a confining member which holds the receiving-shell in form to receive the plastic material and the release of which permits expansion of the receiving-shell, as aforesaid. The receiving-shell herein shown is made of two longitudinally-divided complemental parts, which when assembled and held together by the retaining member are of proper cross-sectional dimensions to form a post or the like to be molded therein.

The invention consists in the matters hereinafter set forth, and more particularly pointed out in the appended claims.

In the drawings, Figure 1 is a perspective view of the mold made in accordance with my invention. Figs. 2 and 3 illustrate separately the two members of the receiving-shell. Fig. 4 is a perspective view of the upper end of the clamping or confining member for holding together the two members of the mold-shell. Fig. 5 is an enlarged cross-sectional view of the assembled mold. Fig. 6 is a view of the same parts, showing also therein the material constituting the molded fence-post and the manner of securing wire-fastening devices in the post. Fig. 7 illustrates one form of wire-fastening device.

As shown in the drawings, the mold consists, essentially, of an upright shell open at both ends and composed principally of two longitudinally-separable members A and B, which when brought together constitute the complete tubular shell. The member A comprises the principal part of the cross-section of the shell, it being provided at one side with an elongated opening or slot $a$, through which is inserted the member B when the mold is assembled, said members fitting complementally to constitute the complete mold-shell. In the present instance the mold is shaped to form octagonal posts or like articles which taper from their lower end to their upper ends, and the member A embraces seven sides of the octagonal mold, while the member B is provided with one side $b$, which closes the longitudinal opening $a$ of the member A and constitutes the eighth side of the assembled octagonal mold. Said member B comprises also two angular parts $b'$ $b^2$ at each side of the part $b$, which lie against the corresponding parts of the member A, as shown in Fig. 5, when the mold members are assembled, so that they may be readily assembled and dismembered. The members A and B are held together by means of a confining or clamping member C, that fits outside of the exposed side or part of the member B and bridges the opening in the member A. The confining or clamping member C is provided at its longitudinal margin with hook-flanges $c$, that engage complemental hook-flanges $a'$ on the margins of the member A at the sides of the opening $a$ thereof, as shown in Figs. 5 and 6. When the mold members are tapered, as herein shown, the clamping or confining member C is placed in position with the hook-flanges thereof engaging the hook-flanges of the member A, and thereafter the part C is slipped downwardly to effect by a wedging action the bringing together of the mold members to the desired or final cross-sectional dimensions. It will be observed with reference to Figs. 5 and 6 that the side $b$ of the smaller member of the mold constitutes one of the outer faces of the assembled mold, while the other sides of the mold consist of the seven faces of the larger member A. The mold may be made of other cross-sectional shapes while retaining the principle of assembling and operation thereof shown.

Cement articles of this character are usually provided with a strengthening-core, the core D herein shown being made M-shaped. Such core is placed in the mold after the same has been assembled prior to the pouring operation, so as to be embedded in the plastic material poured thereover, when it subsequently hardens.

When manufacturing fence-posts, some means must be provided for attaching thereto the wires or other parts of the fence which the posts support. Means are herein shown for attaching a specific form of wire-fastening device E. (Shown in detail and separated from the other parts in Fig. 7.) The fastening device consists of shank portions $e$ and eyes $e'$, when assembled in the post, the eyes projecting laterally from the post and are vertically separated to receive laterally in the space between them a fence-wire, as the wire G, Fig. 7. The wire is held in place by a pin or wire $e^2$, inserted vertically through the eyes laterally outside of the fence-wire. Usually a single wire $e^2$ coöperates with all the fasteners of one post for retaining the fence-wires engaged with the fasteners of a single post. Said fastening device is made from a single piece of wire and is formed to constitute the upper and lower shanks $e\ e$ referred to and at their outer ends the eyes $e'$, above mentioned. The shank members $e$ of said fasteners are made of such form as to prevent the same being readily pulled out of the posts and conveniently fit within the spaces between the inner and outer side members of the core. As herein shown, the ends of the wire forming the fasteners are turned outwardly away from each other to constitute holding-prongs $e^3$, and the looped part $e^4$ of the wire is spread to constitute a like holding device. As a means of fixing said fastening devices in the posts when they are molded one of the mold members, the side $b$ of the member B, as herein shown, is provided with a plurality of pairs of vertically-separated slots $b'$, through which the eye portions of the fastening devices are extended during the pouring operation, the shanks of said fastening devices extending into the interior of the mold. Said fasteners are adapted to be inserted through said openings $b'$ before the mold members are assembled, as shown in Fig. 3. In order to hold the fasteners in proper position during the pouring operation, a rod F is preferably extended through all of the eyes of the series of fasteners of the post, as indicated in Fig. 3. The clamping member C is arched to afford space for the projection of the eyes of the fastening devices from the front face $b$ of the smaller member of the mold. After the form has become set the fastening member C is withdrawn upwardly from the mold members, and the member B of the mold is drawn laterally away from the member A, so as to permit the same to be removed, notwithstanding the projection of the eyes of the fastening devices therethrough. The foregoing constitutes one convenient form of fastener and means of fixing the same in the posts. It will be observed, however, that other forms of fasteners may be employed and in which event the confining or clamping member of the mold may be modified. Moreover, the posts may be formed with through-openings designed to receive fasteners in the same manner as shown in my copending application for United States Letters Patent, Serial No. 255,638—that is to say, by providing the mold members with registering apertures through which are passed rods to form said openings and which are withdrawn after the molded form has set, but before it has fully hardened.

The mold herein shown is designed to be operated in the same manner as are the molds shown in my aforesaid application—that is to say, arranged upright during the pouring operation—after which the molds are withdrawn and the molded forms allowed to stand in a vertical position during the subsequent hardening process.

I claim as my invention—

1. A mold for molding fence-posts and other elongated articles from plastic material, comprising an upright tubular mold open at both ends and consisting of two longitudinally-separated, complementally-fitted, members one of which fits partially within the other, and means engaging one of said members for confining the mold members together in operative position.

2. A mold for molding fence-posts and other elongated articles from plastic material, comprising an upright tubular mold open at both ends and consisting of two longitudinally-separated, complementally-fitted, members, one of which fits partially within the other, and a clamping member having marginal interlocking engagement with the outer mold member for holding the mold members in assembled position.

3. A mold for molding fence-posts and other elongated articles from plastic material, comprising an upright tubular mold open at both ends and made of two longitudinally-separated, complementally-fitted, mold members one of which fits partially within the other, and a clamping member provided with marginal hook-flanges adapted to slidingly engage complemental hook-flanges on the margins of the outer member of the mold.

4. A mold for molding fence-posts and other elongated articles from plastic material, comprising an upright tubular mold open at both ends and made of two longitudinally-separated, complementally-fitted, mold members, one of which fits partially within the other, and a clamping member provided with marginal hook-flanges adapted to slidingly engage complemental hook-flanges on the margins of the outer member of the mold, one of said mold members being provided with a series of vertically-separated openings.

5. A mold for molding fence-posts and other elongated articles from plastic material, comprising an upright tubular mold member consisting of two longitudinally-separated, complementally-fitted, parts, one contained partially within the other, an arch-shaped clamping member provided with marginal hook-flanges adapted to engage complemental flanges on the outer member of the mold, the inner member of the mold being provided in one of its sides with a plurality of vertically-separated openings adapted to hold in place fastening devices during the molding operation.

6. A mold for molding fence-posts and other elongated articles from plastic material, comprising an upright tubular mold open at both ends and consisting of two longitudinally-separated, complementally-fitted members, one of which fits partially within the other, hooked flanges on the outer member of the mold, and clamping means engaging said hooked flanges for holding the mold members in their assembled positions.

In testimony that I claim the foregoing as my invention I affix my signature, in presence of two witnesses, this 4th day of May, A. D. 1905.

JOHN J. LUCK.

Witnesses:
A. M. MOORE,
C. T. BUNN.